July 31, 1956 — O. E. STAPLES — 2,756,606
YIELDABLE NUT
Original Filed March 8, 1951

INVENTOR.
OTIS E. STAPLES
BY Hudson, Boughton,
Williams, David & Hoffmann
ATTORNEYS United States Patent Office 2,756,606
Patented July 31, 1956

2,756,606
YIELDABLE NUT

Otis E. Staples, Euclid, Ohio, assignor to The Cleveland Hobbing Machine Company, Euclid, Ohio, a corporation of Ohio Original application March 8, 1951, Serial No. 214,540, now Patent No. 2,642,702, dated June 23, 1953. Divided and this application May 18, 1953, Serial No. 355,562

1 Claim. (Cl. 74—424.8)

The present invention relates to machine tools and, more particularly, to a machine tool comprising a lead screw and cooperating feed nut for moving one or more of the machine tool elements relative to other parts of the machine.

The principal object of the present invention is the provision of a novel and improved machine tool wherein a lead screw and feed nut are employed to produce relative movement of one or more of the parts with respect to other parts, etc., and it comprises an improved feed nut for cooperation with the lead screw, which feed nut is so constructed and arranged as to eliminate backlash between the screw and nut.

Another object of the present invention is the provision of a novel and improved feed nut for machine tools and the like comprising two approximate half nuts connected to adjacent sides of substantially parallel flat springs approximately midway between their ends and which springs have their ends supported in spaced relationship and press the half nuts into engagement with the cooperating lead screw, thereby eliminating backlash between the screw and nut.

Figure 1:
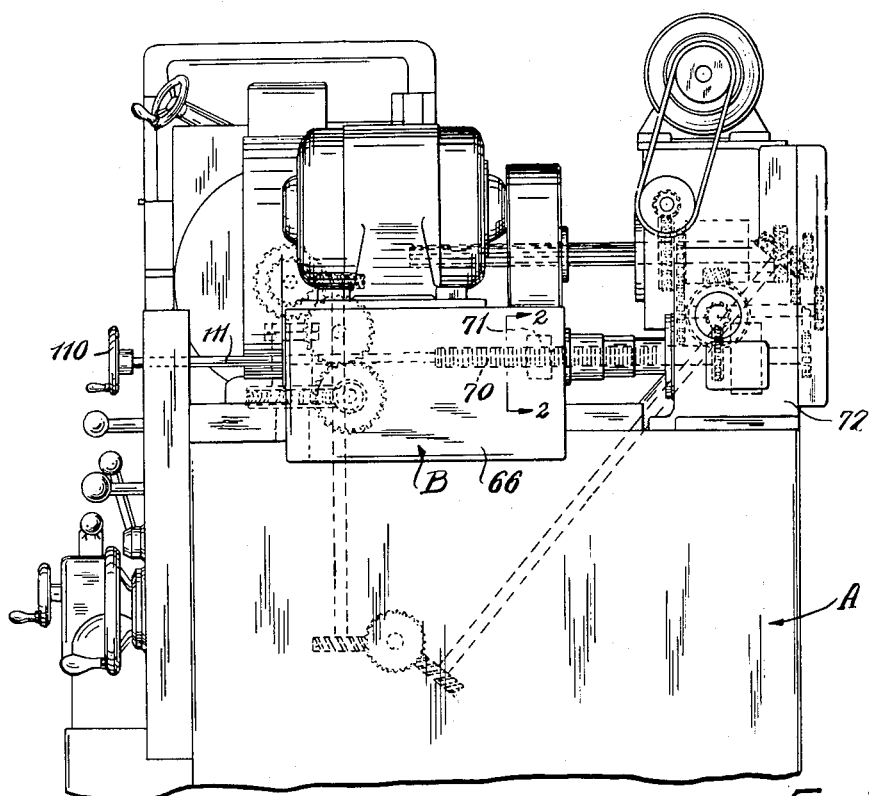
Figure 2:
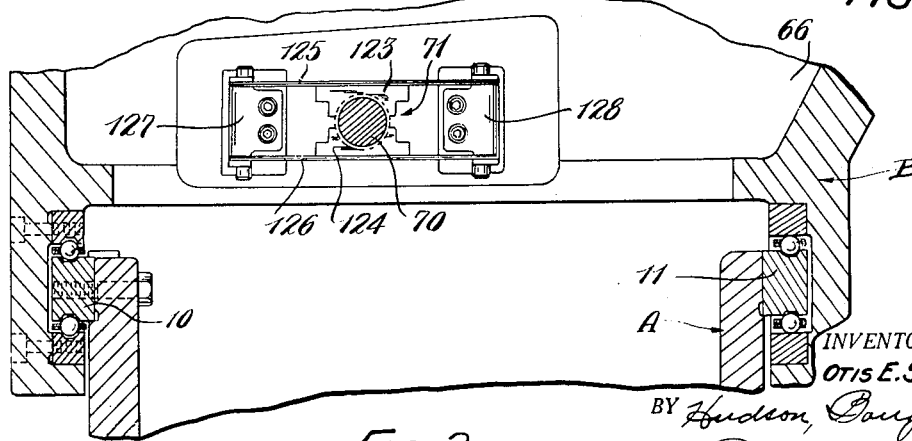

The invention resides in certain constructions and combinations and arrangements of parts and further objects and advantages will be apparent to those skilled in the art to which the invention relates from the following description of the preferred embodiment described with reference to the accompanying drawings forming a part of this specification in which similar reference characters designate corresponding parts, and in which Fig. 1 is an elevational view of a gear grinding machine embodying the invention; and Fig. 2 is a fragmentary sectional view approximately on the line 2—2 of Fig. 1.

The present invention may be embodied in machines of different construction but, for purposes of illustration, is herein shown and described as embodied in a machine especially adapted for grinding gears of the approximate size used in automobile speed change transmissions and the like. This application is a division of my copending application Serial No. 214,540, filed March 8, 1951, and upon which United States Letters Patent No. 2,642,702, issued on June 23, 1953.

The machine is shown and described in detail in the aforesaid patent and only parts thereof are herein shown and referred to. Reference is made to the patent for a complete showing and description of the machine. In general, the machine comprises a base or bed A having transversely extending ways 10, 11 upon which a slide, designated generally as B, hereinafter called the grinding wheel carriage or slide, is supported.

The slide or carrier B is adapted to be moved along the ways 10, 11 by a cooperating lead screw 70 and nut 71. The lead screw 70 is rotatably supported against endwise movement in a gear box 72 bolted to the base A and the nut 71 is fixedly secured to the rear wall of the frame 66 of the carrier B.

The feed nut 71 with which the lead screw 70 engages comprises two half nuts 123, 124 fixed to resilient members 125, 126 approximately midway between their ends. The members 125, 126 are connected to the front wall of the frame 66 of the carriage B by having their ends bolted to brackets 127, 128, which brackets, in turn, are bolted to the frame 66. The two half nuts are preferably manufactured as a unit and subsequently split and the resilient members 125, 126 to which they are attached preferably force the nut members 123, 124 into engagement with the lead screw 70 with considerable pressure, which construction eliminates any lost motion or backlash which may otherwise be present between the lead screw and nut 70, 71. The construction also permits the nut sections 123, 124 to be readily forced apart by suitable manual means (not shown) so as to clear the threads of the lead screw, thus permitting the carriage B to be moved rapidly relative to the lead screw 70 and the nut 71 to be re-engaged with the screw in a predetermined position. The lead screw 70 may be rotated by hand to adjust the carriage B by a hand wheel 110 connected to the front end of a shaft 111 operatively connected to the screw 70.

From the foregoing description of the preferred embodiment of the invention, it will be apparent that the objects heretofore enumerated and others have been accomplished and that there has been provided a novel and improved machine tool and feed nut construction. While the preferred embodiment of the invention has been shown and described in considerable detail, the invention is not limited to the particular construction illustrated and it is my intention to cover hereby all adaptations, modifications and uses thereof which come within the practice of those skilled in the art to which the invention relates and within the scope of the appended claim.

Having thus described my invention, I claim:

In a machine tool, a movable carriage, means for moving said carriage comprising a screw, a pair of parallel flat springs, support means on said carriage for supporting the ends of said springs, said springs being located on opposite sides of and generally transverse to said screw, a first member supported by the central portion of one of said springs having threads adapted to engage the threads of said screws, a second member supported by the central portion of the other of said springs and having threads adapted to engage said screw at a point opposite said first member, each of said members encompassing approximately but less than half of the circumference of said screw, said springs urging said members toward each other and into engagement with said screw, and means for rotating said screw to move said carriage.

References Cited in the file of this patent

UNITED STATES PATENTS

| | | |
|---|---|---|
| 825,151 | McLean | July 3, 1906 |
| 2,138,784 | Cooley et al. | Nov. 29, 1938 |
| 2,233,951 | Conrad | Mar. 4, 1941 |